United States Patent [11] 3,634,085

[72] Inventor Balwant Singh
Stamford, Conn.
[21] Appl. No. 14,240
[22] Filed Feb. 25, 1970
[45] Patented Jan. 11, 1972
[73] Assignee American Cyanamid Company
Stamford, Conn.

[54] PHOTOSENSITIVE COMPOSITIONS COMPRISING 1,1-DISUBSTITUTED-1,2-DIHYDRO-2,4-DISUBSTITUTED PHTHALAZINES
6 Claims, No Drawings

[52] U.S. Cl. ..................................... 96/48, 96/90
[51] Int. Cl. ..................................... G03c 5/24, G03c 1/72
[50] Field of Search .......................... 96/48, 90

[56] References Cited
UNITED STATES PATENTS
3,446,648 5/1969 Workman..................... 96/48
3,351,467 11/1967 Sprague....................... 96/90

Primary Examiner—Norman G. Torchin
Assistant Examiner—Richard E. Fichter
Attorney—Robert P. Raymond ABSTRACT: The 1,1-disubstituted-1,2-dihydro-2,4-disubstituted-phthalazine compounds of Formula I are converted to the azomethineimine dyes of Formula II by irradiation with ultraviolet light. The conversion is useful in photographic processes.

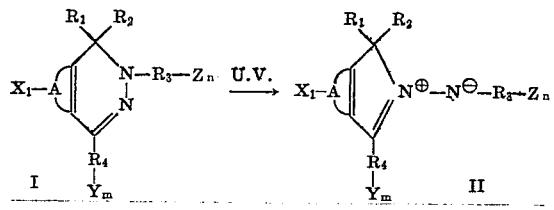

where A completes a fused, mono or polynuclear aromatic ring, having 6 to 10 carbon atoms; X is a member selected from the group consisting of chloro, lower alkyl, having from 1 to 4 carbon atoms, and phenyl; $l$ is a positive integer from 1 to 3; $R_1$ and $R_2$ are the same or different members selected from the group consisting of alkyl, having from 1 to 8 carbon atoms, phenyl, naphthyl and benzyl; $R_3$ is a phenyl or 1-naphthyl group; Y is a member selected from the group consisting of dimethylamino and methoxy; $m$ is an integer from 0 to 1; $R_4$ is a phenyl or naphthyl group; Z is a 4-nitro group; and $n$ is an integer from 0 to 1.

PHOTOSENSITIVE COMPOSITIONS COMPRISING 1,1-DISUBSTITUTED-1,2-DIHYDRO-2,4-DISUBSTITUTED PHTHALAZINES

This invention relates to certain photosensitive phthalazine compounds. More particularly, it relates to the phthalazine compounds of Formula I and to their conversion to the azomethineimine dyes of Formula II upon exposure to ultraviolet light. It further relates to photosensitive compositions and imaging processes employing said compounds.

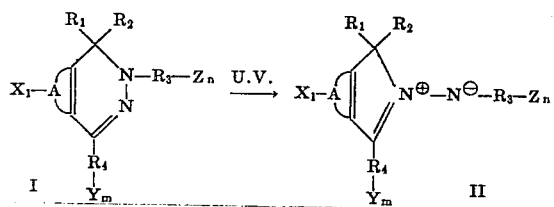

where A completes a fused, mono or polynuclear aromatic ring, having six to 10 carbon atoms; X is a member selected from the group consisting of chloro, lower alkyl, having from one to four carbon atoms; and phenyl; $l$ is a positive integer from 1 to 3; $R_1$ and $R_2$ are the same or different members selected from the group consisting of alkyl, having from one to eight carbon atoms, phenyl, naphthyl and benzyl; $R_3$ is a phenyl or 1-naphthyl group; Y is a member selected from the group consisting of dimethylamino and methoxy; $m$ is 0 or 1; $R_4$ is a phenyl or naphthyl group; Z is a 4-nitro group; and $n$ is 0 or 1.

It is an object of this invention to provide novel photosensitive compounds and compositions. It is a further object to provide a convenient process for the preparation of intensely colored azomethineimine dyes. It is a further object to provide a novel photographic process for the formation of color images of high contrast and stability. These and other objects will become apparent from the description which follows.

It has now been discovered that the foregoing objects are satisfied by a photochemical process utilizing the conversion of the 1,1-disubstituted-1,2-dihydrophthalazine compounds of Formula I to the colored azomethineimine dyes of Formula II.

The phthalazine compounds of Formula I can be conveniently prepared by first reacting a hydrazine compound of Formula IV with a keto substituted aryl carboxylic acid of Formula III by the procedure of W. Roser, Ber., 18, 802(1885), followed by consecutive Grignard reactions. The general reaction scheme is shown below:

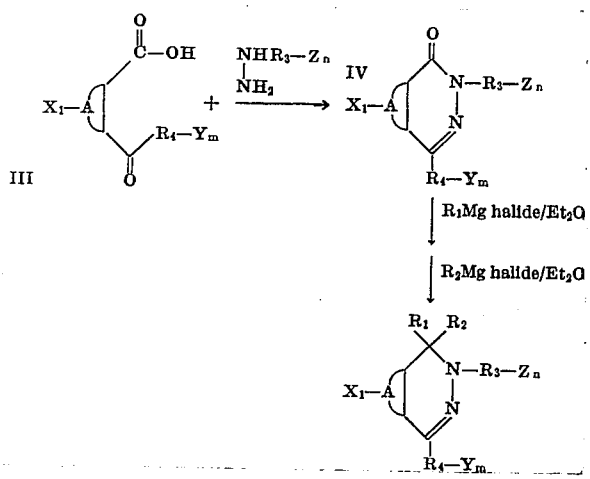

where A, $R_1$, $R_2$, $R_3$, $R_4$, X, $l$, Y, $m$, Z and $n$ are as defined above.

Illustrative of suitable phthalazine compounds of Formula I are:

1,1-dimethyl-1,2-dihydro-2,4-diphenylphthalazine
1,1-di-n-butyl-1,2-dihydro-2,4-di-α-naphthylphthalazine
1,1-di-n-octyl-1,2-dihydro-2,4-di-α-naphthylphthalazine
1,1-diphenyl-1,2-dihydro-2-p-nitrophenyl-4-(p-dimethylaminophenyl)phthalazine
1,1-di-α-naphthyl-1,2-dihydro-2-(p-nitrophenyl)-4-(p-methoxyphenyl)phthalazine
1,1-di-β-naphthyl-1,2-dihydro-2-phenyl-4-phenylphthalazine
1,1-dibenzyl-1,2-dihydro-2,4-diphenylphthalazine
1,1-diethyl-1,2-dihydro-2,4-diphenylbenzo-[g]-phthalazine
1,1-dibenzyl-1,2-dihydro-2-(α-naphthyl)-4-phenylbenzo-[g]-phthalazine
1,1-diphenyl-1,2-dihydro-2-(p-nitrophenyl)-4-(p-dimethylaminophenyl)-benzo-[h]-cinnoline Suitable aryl hydrazine compounds of Formula IV include, for example: unsubstituted phenyl or naphthyl hydrazine compounds, such as, phenyl hydrazine, 1-naphthyl hydrazine and 2-naphthyl hydrazine; p-nitrophenyl hydrazine and 4-nitro-1-naphthyl hydrazine.

Suitable 2-benzoylarylcarboxylic acid compounds of Formula III include, for example: 2-benzoyl benzoic acid, 2-(α-naphthoyl)benzoic acid, 3-benzoyl-2-naphthoic acid, 2-(α-naphthoyl)-2-naphthoic acid, 2-benzoyl-3-chloro benzoic acid, 2-benzoyl-2-chloro benzoic acid, 2-benzoyl-4-methyl benzoic acid, 2-benzoyl-4-t-butyl benzoic acid, 2-benzoyl-5-phenyl benzoic acid, 2-benzoyl-3,4,5-triphenyl benzoic acid, 2-benzoyl-3,6-dichloro benzoic acid, 2-benzoyl-3,7-diemthyl-1-naphthoic acid, 2-benzoyl-1-naphthoic acid, 1-benzoyl-2-naphthoic acid, 1-benzoyl-3,7-dimethyl-2-naphthoic acid, 1-benzoyl-7-methyl-2-naphthoic acid, 2-(p-dimethylaminobenzoyl)benzoic acid, 2-(p-methoxybenzoyl)benzoic acid.

Suitable Grignard reagents include, for example, methyl magnesium chloride, n-butyl magnesium chloride, n-octyl magnesium chloride, phenyl magnesium chloride, 1-naphthyl magnesium chloride and benzyl magnesium chloride.

The phthalazine compounds may be irradiated either neat in a solid state, or dissolved, suspended or dispersed in a solvent. Preferred solvents do not themselves adsorb ultraviolet light at the frequencies employed. Suitable solvents include, for example, benzene, toluene, xylene, diethylamine, pyridine, dimethylformamide and mixtures thereof.

Any source of ultraviolet radiation can generally be used in the practice of the present invention. It is preferred to select sources having frequencies which correspond to the absorption maxima of the particular photosensitive compounds being employed. A convenient source of radiation is a bank of fluorescent lamps alternating in type between sunlight phosphor lamps and blacklight fluorescent lamps. Suitable lamps include, for example, 15-watt Black Light, No. F15T8-BL by General Electric and Rayonet Photochemical Reactor Lamps, No. RPR 3000A by The So. N.E. Ultraviolet Company.

The optimum period of irradiation will naturally vary with the particular radiation source employed, the particular compound selected and the environment in which it is presented, among other factors.

For the purpose of imaging the activating light is patterned by any conventional means. Suitable means include, for example, positioning film transparencies or templates in which the image areas are transparent to ultraviolet light while the backgrounds are substantially opaque, between the light source and photosensitive composition. In addition, the patterning can be achieved by means of a U.V. emitting cathode ray tube, such as, those containing P-16 phosphors or with a U.V. laser.

The photosensitive compositions are conveniently prepared by uniformly coating a phthalazine compound of Formula I on a conventional, absorbent photographic substrate, such as, paper. Uniform coatings may be conveniently prepared by first dissolving the phthalazine compound selected in a suitable organic solvent such as, acetone, benzene, toluene or tetrahydrofuran. The substrate is then immersed in the solution and then dried at room temperature in the dark.

The images produced on the photosensitive compositions may be fixed by applying cupric chloride dissolved in a suitable solvent, such as, acetonitrile or acetone, to the surface of the image. To minimize smearing, it is preferred to apply the fixing solution in the form of a fine spray or mist.

The invention is further illustrated by the following examples which are not to be taken as limitative thereof. All parts and percentages are by weight unless otherwise indicated.

EXAMPLE 1

Preparation of 2,4-Diphenyl-1(2H)-phthalazinone

A solution of o-benzoylbenzoic acid (22.6 grams, 0.1 mole) and phenyl hydrazine (12.0 grams, 0.11 mole) dissolved in 300 ml. of 95 percent ethanol was heated at reflux for a period of about 24 hours. The reaction mixture was cooled to room temperature. The 2,4-diphenyl-1(2H)-phthalazinone formed precipitated from solution, was collected by filtration, washed with 50 ml. of ethanol and air dried to produce a crude product (28.4 grams, 94 percent yield) having a melting point of 165°–167° C. The crude product was purified by recrystallization from acetic acid to produce a white crystalline product having a melting point of 166°–167° C.

Preparation of 1,1-Dibenzyl-1,2-dihydro-2,4-diphenylphthalazine

An ethereal solution of benzyl magnesium chloride was prepared using standard procedures by reacting magnesium (3.2 grams, 0.13 mole) with benzyl chloride (22.0 grams, 0.17 mole) in 200 ml. of anhydrous ether under a nitrogen atmosphere. A solution of 2,4-diphenyl-1(2H)-phthalazinone (6.0 grams, 0.021 mole) dissolved in 200 ml. of benzene was added dropwise with stirring to the solution of benzyl magnesium chloride. The resulting solution was refluxed on a steam bath for a period of four hours and allowed to stand at room temperature overnight. A saturated aqueous solution of ammonium chloride was added in sufficient quantity to decompose the remaining Grignard reagent and to dissolve the magnesium salts. The organic layer was separated, washed with water and dried over anhydrous magnesium sulfate. The solvent was removed by evaporation and the resulting oil was dissolved in 15 ml. of benzene which had been heated to about 80° C. The benzene solution was diluted with 100 ml. of petroleum ether. The desired product in the form of a microcrystalline solid, pale yellow in color, was removed by filtration. Purification was effected by redissolving the solid in 15 ml. of benzene which had been warmed to 80° C., followed by dilution with 100 ml. of petroleum ether. 1,1-Dibenzyl-1,2-dihydro-2,4-diphenylphthalazine in the form of a colorless, microcrystalline solid having a melting point of 185° C. and an elemental analysis corresponding to the empirical formula: $C_{34}H_{28}N$, was obtained.

Calcd.: C, 87.93; H, 6.03; N, 6.03
Found: C, 87.99; H, 6.18; N, 6.12.

EXAMPLE 2

Irradiation of 1,1-Dibenzyl-1,2-dihydro-2,4-diphenylphthalazine 1,1-Dibenzyl-1,2-dihydro-2,4-diphenylphthalazine (0.2 g.) was dissolved in a mixture of benzene (50 ml.) and diethylamine (50 ml.). Nitrogen was bubbled through the resulting solution for a period of 3 minutes to remove dissolved oxygen. The resulting solution was placed in a Pyrex flask and irradiated with ultraviolet light from a high-pressure mercury vapor lamp (General Electric "B-H$_6$") for a period of about 5 hours. The solvent was removed by evaporation. The remaining crystals were dissolved in 25 ml. of absolute ethanol which was previously cooled to about 0° C. The resulting solution was quickly filtered and the filtrate was evaporated to dryness to produce 0.15 g. of the crude, orange-red azomethineimine dye. Purification was effected by recrystallization from anhydrous ether. The product, 2-anilino-1,1-dibenzyl-3-phenyl-1(H)-isoindolium hydroxide inner salt, in the form of dark red crystals, had a melting point of 162°–163° C., and the following elemental analysis:

Calcd.: C, 87.93; H, 6.03; N, 6.03
Found: C, 87.79; H, 6.16; N, 6.27.

EXAMPLE 3

Imaging with 1,1-Dibenzyl-1,2-dihydro-2,4-diphenylphthalazine

A 20 percent by weight solution of 1,1-dibenzyl-1,2-dihydro-2,4-diphenylphthalazine in benzene was prepared. A sheet of 32 pound white paper was immersed into the phthalazine solution and then dried at room temperature overnight in the dark.

The resulting photosensitive composition was exposed to ultraviolet light from a bank of sunlight phosphor and blacklight fluorescent lamps having a transparency interposed between the composition and light source. A red-orange negative image was produced.

I claim:

1. An image-forming composition comprising a photographic substrate having absorbed thereon a compound of the formula:

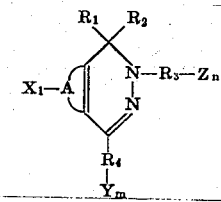

where A completes a fused, mononuclear or polynuclear aromatic ring, consisting of six to 10 carbon atoms; X is a member selected from the group consisting of chloro, lower alkyl, having from one to four carbon atoms, and phenyl; $l$ is a positive integer from 1 to 3; $R_1$ and $R_2$ are the same or different members selected from the group consisting of alkyl, having from one to eight carbon atoms, phenyl, naphthyl and benzyl; $R_3$ is a phenyl or 1-naphthyl group; Y is a member selected from the group consisting of dimethylamino and methoxy; $m$ is an integer from 0 to 1; $R_4$ is a phenyl or naphthyl group; Z is a 4-nitro group; and $n$ is an integer from 0 to 1.

2. The composition of claim 1 wherein the phthalazine compound is: 1,1-dibenzyl-1,2-dihydro-2,4-diphenylphthalazine.

3. A photoimaging process comprising the step of forming a colored image by irradiating a photosensitive composition of claim 1 with patterned ultraviolet light.

4. The process according to claim 3 further comprising the step of fixing by applying cupric chloride to the surface of the irradiated composition.

5. A composition according to claim 1 wherein said aromatic ring is a benzene ring.

6. A composition according to claim 1 wherein said aromatic ring is a naphthylene ring.